United States Patent [19]

Klemm et al.

[11] E Patent Number: Re. 33,646

[45] Reissued Date of Patent: Jul. 23, 1991

[54] DISPENSING POUCH CONTAINING PREMEASURED LAUNDERING COMPOSITIONS AND WASHER-RESISTANT DRYER ADDITIVE

[75] Inventors: Steven R. Klemm, Grand Rapids; Michael R. Foote, Hudsonville, both of Mich.

[73] Assignee: Amway Corporation, Ada, Mich.

[21] Appl. No.: 340,537

[22] Filed: Apr. 18, 1989

Related U.S. Patent Documents

Reissue of:

[64] Patent No.: 4,659,496
Issued: Apr. 21, 1987
Appl. No.: 825,018
Filed: Jan. 31, 1986

[51] Int. Cl.[5] ..... C11D 17/00; C11D 17/04; D06M 13/46; D06M 13/52

[52] U.S. Cl. ..... 252/90; 206/0.5; 206/54; 206/95; 206/219; 206/524.1; 206/568; 252/8.8; 252/91; 252/92; 252/174; 383/102; 427/242

[58] Field of Search ..... 206/0.5, 54, 95, 219, 206/524.1, 568; 252/8.8, 90, 91, 92, 174; 383/102; 427/242

[56] References Cited

U.S. PATENT DOCUMENTS

| | | | |
|---|---|---|---|
| 2,591,663 | 4/1952 | Root | 8/142 |
| 2,941,309 | 6/1960 | Cobb | 34/60 |
| 3,008,835 | 11/1961 | Madding | 206/568 |
| 3,261,185 | 7/1966 | Rihr | 68/213 |
| 3,267,701 | 8/1966 | Mandarino | 68/12 |
| 3,442,692 | 5/1969 | Gaiser | 427/240 |
| 3,651,931 | 3/1972 | Hsiung | 206/568 |
| 3,706,140 | 12/1972 | Brillaud et al. | 34/60 |
| 3,870,145 | 3/1975 | Mizuno | 206/84 |
| 3,947,971 | 4/1976 | Bauer | 34/60 |
| 4,004,685 | 1/1977 | Mizuno et al. | 206/0.5 |
| 4,014,105 | 3/1977 | Furgal et al. | 34/12 |
| 4,026,131 | 5/1977 | Dugger et al. | 68/17 A |
| 4,062,647 | 12/1977 | Storm et al. | 8/137 |
| 4,077,890 | 3/1978 | Barker | 252/8.8 |
| 4,082,678 | 4/1979 | Pracht et al. | 252/8.6 |
| 4,095,946 | 6/1978 | Jones et al. | 8/137 |
| 4,098,937 | 7/1978 | Mizuno et al. | 428/68 |
| 4,099,012 | 7/1978 | Ehrlich | 8/137 |
| 4,108,600 | 8/1978 | Wong | 8/137 |
| 4,113,630 | 9/1978 | Hagner | 252/8.6 |
| 4,118,525 | 10/1978 | Jones | 427/242 |
| 4,149,977 | 4/1979 | Morganson et al. | 252/8.8 |
| 4,170,565 | 10/1979 | Flesher | 252/93 |
| 4,203,851 | 5/1980 | Ramachandran | 252/8.6 |
| 4,234,627 | 11/1980 | Shilling | 427/242 |
| 4,259,373 | 3/1981 | Demessemaekers | 252/90 |
| 4,304,562 | 12/1981 | Bolan et al. | 8/137 |
| 4,348,293 | 9/1982 | Clarke et al. | 252/90 |
| 4,410,441 | 10/1983 | Davies et al. | 252/90 |
| 4,416,791 | 11/1983 | Hag | 252/90 |
| 4,588,080 | 5/1986 | Ginn | 206/219 |

FOREIGN PATENT DOCUMENTS

| | | | |
|---|---|---|---|
| 039527 | 11/1981 | European Pat. Off. | 252/90 |

*Primary Examiner*—Dennis Albrecht
*Attorney, Agent, or Firm*—Price, Heneveld, Cooper, DeWitt & Litton

[57] ABSTRACT

A dispensing pouch containing premeasured laundry compositions comprises a flexible, porous pouch having a plurality of valves or supplementary openings along its edges. The dispensing pouch permits rapid dispersion of a highly soluble laundry detergent through the pouch valves, which open as the pouch is compressed during laundry agitation in a machine washer. Washer-resistant fabric softener/antistatic chips larger than the pouch valve openings remain inside the pouch through wet cycles, to be dispensed as they melt and wick through the porous pouch fabric in a machine dryer.

26 Claims, 1 Drawing Sheet

DISPENSING POUCH CONTAINING PREMEASURED LAUNDERING COMPOSITIONS AND WASHER-RESISTANT DRYER ADDITIVE

Matter enclosed in heavy brackets [ ] appears in the original patent but forms no part of this reissue specification; matter printed in italics indicates the additions made by reissue.

BACKGROUND OF THE INVENTION

The present invention generally relates to articles for dispensing fabric laundering compositions in automatic clothes washers and dryers. Compositions which are typically added to machine clothes washers and dryers during the laundering process include detergents and fabric softener/antistatic agents. In one aspect, the present invention relates to laundering composition dispensers which provide timed release of laundering agents during the laundering cycle. In another aspect, this invention provides a fabric softener/antistatic composition which, when contained in a suitable dispenser, remains substantially inactive during the wash and rinse cycle yet dispenses during the drying cycle. The present invention also provides a detergent composition which rapidly and completely dispenses during the wash cycle when contained in the dispenser of the present invention.

Introducing laundry additives into automatic washers and dryers in specific quantities at precise intervals has long been a problem for consumers and the detergent industry. Conventional laundering techniques include measuring an effective amount of detergent to be added to the washer at the beginning of the wash cycle and repeating the step for a fabric softener/antistatic agent during the rinse cycle. Although attempts have been made to reduce the number of steps necessary to add detergent and fabric softener/antistatic agents to clothes during the laundering operation, to date these efforts have achieved only limited success. It whould therefore be desirable to provide a clean, neat, reliable method of introducing both detergent and fabric softener/antistatic agent at the beginning of the wash cycle in a single, pre-measured, disposable pouch.

Most fabric softener/antistatic compounds provide softening and antistatic action by depositing cationic particles onto fabric surfaces. They impart desirable qualities such as pleasing tactile properties, reduction of static electrically and the adherence of dirt and dust particles, reduction of fabric wrinkles and generally permit treated fabrics to be more easily separated following the drying cycle. Typically, fabric softener/antistatic compositions contain a cationic quarternary ammonia compound. These positively charged particles, however, interfere with anionic soil components as well as with anionic surfactants which are present in many conventional detergent compounds. This charge attraction between cationic and anionic components forms unwanted precipitates which may accumulate on fabric surfaces commonly in the form of redeposited soil. In order to eliminate this source of interference, it is desirable to keep anionic and cationic components separated during the laundering process.

Different approaches have been taken in the past in attempting to eliminate this charge interference. In U.S. Pat. No. 3,267,701 to Mandarino, it is suggested that fabric softener/antistat compositions be added during the drying phase only. This requires a two-step procedure for adding detergent and softener, which procedure is similarly disclosed in U.S. Pat. No. 3,947,971 to Bauer, U.S. Pat. No. 4,098,937 to Mizuno et al, and U.S. Pat. No. 4,149,977 to Morganson et al. Both Mizuno and Morganson suggest that their reusable softener dispensers be attached to dryer vanes for multiple cycles, which is impractical in laundromat-type settings.

U.S. Pat. No. 4,082,678 to Pracht et al discloses a multiple chamber pouch design with a pH-sensitive inner pouch containing a fabric softener. The outer pouch releases a pH modifier which delays solubilization of the inner pouch until the pH-neutral rinse cycle. A similar approach is taken in U.S. Pat. No. 4,108,600 to Wong where individual fabric softener particles are coated with a pH-sensitive material. U.S. Pat. No. 4,113,630 to Hagner discloses a large softener impregnated, insoluble substrate which contains a detergent.

In U.S. Pat. No. 4,203,851 to Ramachandran, detergent builder beads are impregnated with fabric softener. In U.S. Pat. No. 4,259,373 to Demessemakers et al, a double layered porous pouch releasably contains a fabric softener/antistat composition.

SUMMARY OF THE INVENTION

The present invention is based on the discovery that the timed release of laundry additives can be achieved by enclosing a washer-effective agent and a dryer-effective agent in a heat-resistant pouch made of a flexible, porous, preferably hydrophobic fabric having multiple side supplementary openings or valves for the release of detergent particles. A suitable washer-effective agent is disclosed which has rapid solubility characteristics and which fully disperses from the preferred dispenser at the beginning of the wash cycle. A dryer-effective is disclosed which resists deterioration and dispersion during the wash and rinse cycles, yet which disperses from the preferred dispenser at an even, controlled rate during the dryer phase. In the preferred embodiment, the washer-effective agent comprises a detergent formulated to resist caking which contains a prehydrated sequestering agent to facilitate rapid solubilization of the detergent composition. The preferred dryer-effective agent comprises a fabric softener/antistatic composition which is formed into uniform flakes or chips which resist deterioration and solubilization during the wash and rinse cycles and which remain inside the dispenser until such time that they are controllably released during the fabric drying cycle.

The method of the present invention involves placing the preferred pouch containing both the preferred detergent and preferred fabric softener/antistat into a machine washer at the beginning of the wash cycle along with fabrics to be laundered. The dispenser is left in the washer throughout the wash cycle during which time substantially all of the preferred detergent composition is released into the wash liquor. The fabric softener/antistat remains substantially inactive inside the dispenser during both the wash and the rinse cycles. The dispenser is carried over along with the laundry to the dryer where the fabric softener/antistat flakes melt and wick through the walls of the dispenser at a controlled rate. The fabric softener/antistat is transferred from the exterior pouch surface to the treated laundry as the pouch comes into contact with the clothing load during tumbling.

DETAILED DESCRIPTION OF THE INVENTION

The Dispenser

Figure 1:
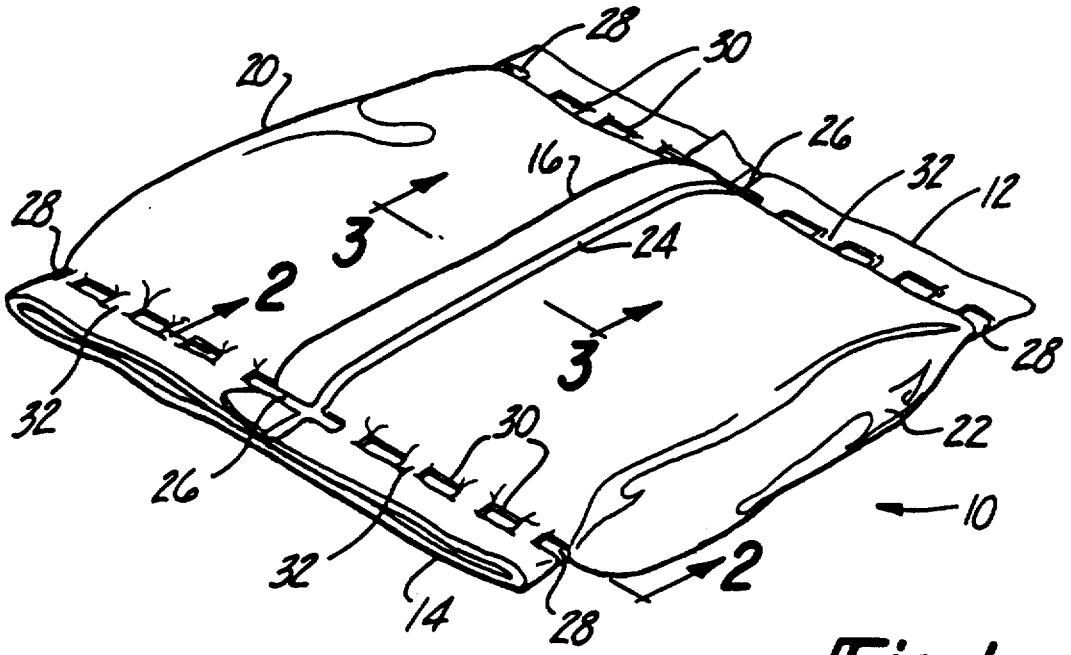
FIG. 1 is a perspective view of the pouch of this invention.

The dispenser which contains the laundry-effective agents is made of a flexible fabric material having a texture which does not substantially abrade typical fabrics laundered by machine washers and dryers. The material should be strong enough to resist tearing and specifically should have sufficient tear resistance when wet to remain intact when subjected to the turbulence encountered during the machine laundering process.

The dispenser material must further withstand the heat of machine dryers, which may reach 90° C., in some dryers for periods in excess of an hour, without undergoing significant chemical or physical changes. While other methods may be suitable, for example sewing or gluing, preferably the dispenser material should be such that it can be heat-sealed by ultrasonic means or the like to form a pouch. Although the specific dimensions of the pouch may vary somewhat, it has been found that a rectangular pouch having dimensions in the range of about four inches in length and four inches in width to about eight inches in length and eight inches in width, with a nominal unfilled thickness dictated by the pouch fabric type and weight, provides an internal chamber of sufficient size to contain an effective amount of laundry agent, yet allows for convenient manufacture and packaging. Most preferred is a pouch five inches long and five inches wide.

The pouch material must have sufficient porosity to allow rapid dispersement of the washer-effective agent while retaining the dryer-effective agent until the drying cycle. During the drying phase, the porosity must be such that the dryer-effective agent is released at controlled rate. The fabric porosity must be sufficiently small to prevent the pouch contents from penetrating the pores or "dusting out" prior to introduction of the pouch into the washer. In the preferred embodiment, the pouch porosity allows for release of fabric softener-/antistat during the dryer phase at an even rate with at least about one-half to one gram of the fabric softener-/antistat being dispensed by the end of a typical drying cycle of about 25 minutes to an hour and a half.

The preferred pouch material should also be essentially hydrophobic. By essentially hydrophobic, it is meant that the amount of water absorbed by the pouch fabric in the washer is small and evaporates in the dryer before typical laundried fabrics become dry. This feature permits the pouch to heat to the melting point of the preferred fabric softener/antistat flakes quickly so that fabric softener/antistat is dispersed throughout the drying cycle.

Suitable fabrics which may be employed in the construction of the pouch of this invention include non-woven, spun-bonded polypropylene, polyethylene, polyester, polyvinyl chloride, cellulose acetate, polyacrylic, or other materials possessing similar properties, which will be known by those skilled in the art. Although some natural fabrics may be acceptable, most natural fabrics are not sufficiently hydrophobic unless treated with an insoluble coating. Other materials which may be useful in constructing the pouch of this invention are the open celled foams known to the art, such as urethanes. Depending on the type of fabric utilized, best results are obtained when the average dry weight of the fabric is in the range of 1.5 ounces per square yard to about 1.8 ounces per square yard. It has been found that non-woven, spun-bonded polypropylene having an average weight per square yard of 1.5 ounces, such as that manufactured by the Kimberly-Clark Company under the trademark Duraguard, is especially preferred.

In the preferred embodiment, a single piece of porous fabric is formed into a rectangular pouch by wrapping it around a hollow vertical mandrel and ultrasonically heat sealing a vertical or longitudinal line of joinder where the two longitudinal edges of the fabric overlap. A transverse row of intermittent heat-sealed lines provides a partial closure of the lower edge of the tube, and, as will be further explained below, prevents premature dispensing or dusting of the contents from the pouch while permitting enhanced flow of water into and out of the pouch during the wash cycle. With the lower portion of the pouch substantially closed, it may then be filled with a predetermined quantity of detergent and fabric softener/antistat from the hollow interior of the mandrel. Following the filling step, the tube-shaped pouch pre-form is indexed downwardly on the mandrel and a similar row of intermittent heat-sealed lines partially closes the upper edge of the tube preform. The fabric is then severed from the upward adjacent fabric sheet, which will then form the next pouch.

Referring to the drawings, the dispensing container comprises, in its finished form, a generally flat rectangular pouch 10 which is formed of a single piece of porous fabric. The upper and lower edges of the tube-like preform described above are shown at 12, 14, respectively. The outer and inner ends of the overlapping portion are shown at 16, 18, respectively, and the side edges of the pouch are formed by folds 20, 22 where the longitudinal sides of the original tube-like pre-form have been flattened, but not heat-sealed, into the thin rectangular pouch.

The continuous longitudinal heat-sealed joint between the overlapped inner and outer ends 16, 18 is shown at 24. The top and bottom transverse rows of intermittent heat seal lines are identical. Each row consists of a long heat-sealed line 26 which spans across the entire zone of overlap where the two longitudinal edges of the fabric are joined together to prevent such edge from becoming snagged during the agitation of the pouch in the washing and drying machines. Each row also includes a heat-sealed line 28 at the extreme sides of pouch 10 to help eliminate puckering of the fabric at the supplementary openings adjacent its side folds.

Figure 2:
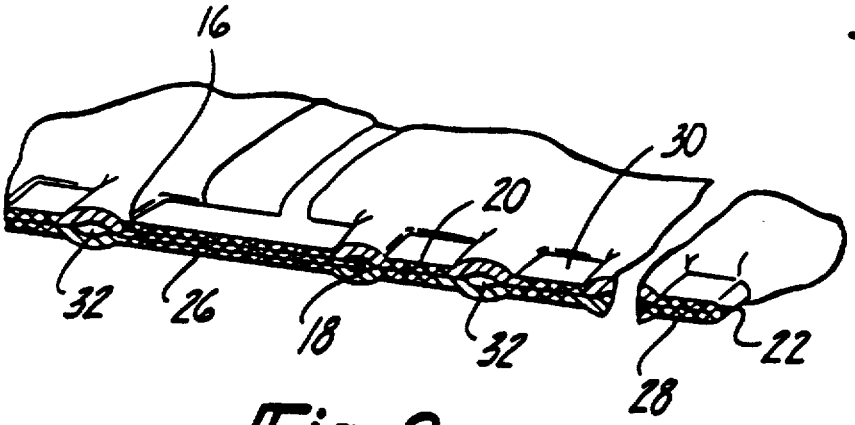
FIG. 2 is a fragmentary cross-sectional view in the direction of arrows 2—2 of FIG. 1, with the vertical scale being somewhat exaggerated for clarity.

Between lines 26 and 28 are a series of three spaced short heat-sealed lines 30 which define therebetween a series of slots 32 which form supplementary openings for a purpose to be explained below. FIG. 2 illustrates in cross-section the heat seal lines 26, 28 and 30 where the two opposed (i.e., front and back) walls of the pouch have been fused together, leaving narrow openings 32 therebetween.

Figure 3:
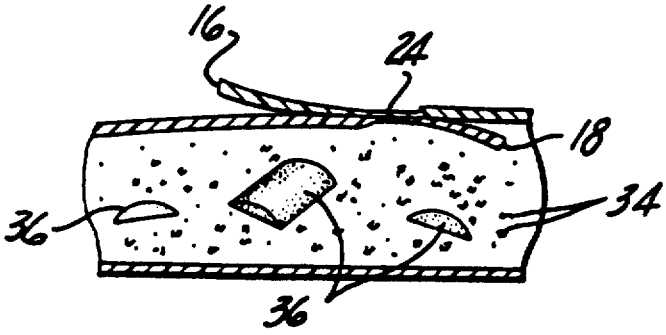
FIG. 3 is an enlarged fragmentary cross-sectional view in the direction of arrows 3—3 of FIG. 1.

FIG. 3 is a further enlarged sectional view through the longitudinally heat-sealed portion of the pouch, showing also detergent granules 34 and softener/antistat chips 36. In the preferred embodiment, chips 36 are formed with at least several corners, to reduce the tendency of such chips to segregate themselves within the surrounding detergent granules, thereby assuring a uniform mixture of detergent and softener/antistat during the storage of the mixture and its subsequent loading into the individual pouches. These corners also aid in preventing undesired exit of the chips from openings 32 of the pouch.

It will be seen from FIG. 1 that the top and bottom transverse rows of heat seals are each spaced from the extreme top and bottom edges 12, 14 of the pouch. The projecting free, unjoined edges of fabric perform a shape-retaining function which helps retain openings 32 in a flat, unpuckered condition, as shown in FIG. 2. This arrangement helps in preventing the small detergent granules 34 from being prematurely dusted out of pouch 10.

A preferred embodiment of pouch 10 is about five inches square, with the transverse rows of heat seals being spaced about three-eighths of an inch edges 12, 14. The slots or openings 32 are about 5–6 millimeters long (measured along the row from side 20 to side 22). This slot dimension is selected for use with a fabric softener/antistat chip which is about one and one-half by five by five millimeters. This dimensional relationship between the chips and the slot size will prevent the chips from passing through the slots, because the long dimension of the slot will decrease as its narrow dimension widens or puckers. As will be appreciated from the subsequent discussion, it is desirable that the slots 32 be as large as possible, while still preventing passage of chips 36, to provide maximum volume of water flow therethrough.

When the pouch is placed in a washing machine, preferably with the clothes initially piled on top of it, the subsequent submergence of the pouch and agitation and impacting by the weight of the wet clothes will cause a pumping action of water in both directions through slots 32. This pumping action will tend to cause the fabric surrounding each slot to flex, allowing the shape of the slots to periodically become more rounded and less narrowed, which in turn will permit particles of undissolved detergent to exit the pouch. Thus, supplementary openings or slots 32 perform a valve-like function, normally preventing premature dusting or dispensing of the pouch contents prior to exposure to the wash cycle, while supplementing and enhancing the rate of water flow which is provided through the pores of the fabric. Adequate water flow through the pouch is essential to assure complete and rapid dispensing and dissolving of the detergent during the wash cycle and before the rinse cycle, even under cold water wash conditions.

It is preferred, but not essential, that two opposite edges of the pouch be provided with slots 32 to assure adequate water flow. Alternatively, a different number or relationship of the slotted edges could be provided. However, the illustrated arrangement is considered optimum, both from a performance standpoint and for ease of fabrication of the pouch. The number of slots is not critical, provided that an adequate water flow path is established and a chip-to-slot dimensional relationship is provided which precludes premature dispensing of the fabric contents.

In order to achieve rapid dispersement of preferred detergent composition and delayed release of the preferred fabric softener/antistat, pouch fabric porosity, as measured by the Frazier air permeability method (ASTM D737), should be from about 80 to about 500 cfm/ft$^2$ and more preferably from about 150 to about 300 cfm/ft$^2$. When used with the preferred laundry additives of this invention, a greater porosity than that set forth may cause dusting of the dry contents and tends to cause excessive spotting of the clothing by the fabric softener, while a lesser porosity hinders detergent and fabric softener/antistat dispensing action. It will be apparent to those skilled in the art that the desired porosity of the pouch fabric will depend somewhat on the physical dimensions of the laundry additives enclosed therein. Both the fabric porosity as well as the placement and relative size of the pouch slots set forth in the preferred embodiment of this invention are crucial to attaining the proper sequential dispensing of the preferred laundry detergent and preferred fabric softener/antistat.

Fabric Softener/Antistat Composition

Figure 4:
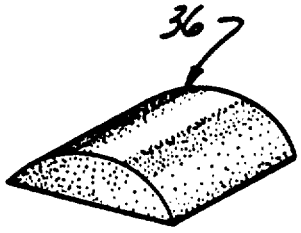
FIG. 4 is an enlarged perspective view of a typical chip of fabric softener/antistat in its preferred shape.

As shown in FIG. 4, the preferred dryer phase-effective agent in the present invention is a fabric softener/antistat composition in the form of flakes or chips 36. Fabric softening and antistatic agents are well known to those skilled in the art and include cationic and nonionic compositions having melting points in the range of from about 25° C. to about 110° C. In order to delay the release of the fabric softener/antistat until the drying cycle, the composition must have a melting point of about 40°–60° C., which is greater than those temperatures encountered in typical automatic washers. The preferred fabric softener/antistat must, however, melt in the range of temperatures encountered in automatic dryers, which is typically 40°–80° C.

The preferred fabric softener/antistat flakes contain a mixture of a cationic fabric softener and a nonionic antistatic agent. The cationic/nonionic blend comprises from about 45 percent to about 55 percent by weight of the fabric softener/antistat flakes. Cationic fabric softener comprises from about 30 percent to about 40 percent of the fabric softener/antistat flakes by weight, and those suited for use in the present invention generally include quarternary ammonium compounds having one or more alkyl group of about 12 to about 24 carbon atoms. Quarternary ammonium compounds having the formula:

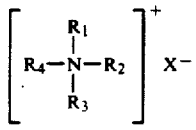

wherein R1 is an alkyl group having from about 12 carbon atoms to about 24 carbon atoms; R2 is an alkyl group having from about 12 carbon atoms to about 24 carbon atoms; R3 is an alkyl group having from about 1 to about 5 carbon atoms; R4 is an alkyl group having from about 1 to about 5 carbon atoms; and $X^-$ is selected from the group of anions including fluorine, chlorine, bromine, phosphate and methylsulfate radicals, are acceptable. Preferred cationic fabric softeners include dicetyldimethylammonium chloride, bis-docosyldimethylammonium chloride, didodecyl-dimethylammonium chloride, ditallowalkyldimethylammonium bromide, ditallowalkyldiethylammonium chloride, ditallowalkyldipropylammonium bromide, ditallowalkyldibutylammonium fluoride, cetyldecylmethylethylammonium chloride, tris-[ditallowalkyldimethylammonium]phosphate and the like. Most preferred are the quarternary ammonium sulfate compounds such as dihydrogenated tallowdimethylammonium methylsulfate.

Suitable nonionic antistatic agents for use in the present invention are well known to those skilled in art. Nonionics comprise from about 10 percent to about 20 percent by weight of the fabric softener/antistat flakes. These include ethoxylated fatty acids, fatty alcohols, fatty glycerides, polyethylene glycols, amine oxides, diamine compounds, sorbitan esters and alkyl amines. Preferred is ethoxylated stearic acid present in a range of from about 13 to about 16 percent by weight of the final fabric softener/antistatic chips. The cationic fabric softener/nonionic antistat blend must be either substantially water-insoluble itself or substantially water insoluble when mixed with other components so that when it is formed into flakes, the flakes resist deterioration and solubilization when subjected to the washer environment. The fabric softener/antistat blend or solubility-modified blend must additionally have a melting point of about 40° C., to about 60° C., to prevent melting in the washer while still permitting the flakes to melt and thus dispense in the dryer.

In order to prevent premature solubilization of the fabric softener/antistat, and to increase the structural integrity of the fabric softener/antistat flakes, the fabric softener/antistat blend is mixed with a dispersion inhibitor which improves the wash endurance of the flake and decreases the fabric softener/antistat solubility so that the flakes do not substantially dissolve in the wash cycle. By substantially dissolve, it is meant that by weight, 60 percent to 70 percent of the fabric softener/antistat survives wash and rinse cycles of up to 50° C. in the presence of detergent. Suitable dispersion inhibitors which provide both structural integrity to the fabric softener/antistat flakes and also which decrease the solubility of the flakes generally include fatty alcohols having from about 14 to about 26 carbon atoms in a concentration of about 25 percent to about 35 percent by weight of the fabric softener/antistat flakes. Suitable fatty alcohols within this range include myristyl alcohol, cetyl alcohol, stearyl alcohol, arachidyl alcohol, behenyl alcohol, and mixtures thereof. It will be apparent to those skilled in the art that there may be other suitable solubility modifiers which can be used which also provide the necessary structural integrity to the fabric softener/antistat flakes to resist deterioration during the wash cycle.

During the drying cycle, the fabric softener/antistat flakes melt inside the pouch and wick through the fabric to the outer pouch surfaces. The rate of penetration of the fabric softener/antistat through the pouch fabric is a function of the melt viscosity and the fabric porosity. In the preferred range of fabric porosity, it has been found that a melt viscosity of from about 15,000 centipoise to about 75,000 centipoise is necessary to ensure even distribution of the fabric softener/antistat onto the laundered fabrics without producing significant spotting. A fabric softener/antistat melt viscosity less than 15,000 centipoise allows the melt to penetrate a pouch of the preferred porosity too quickly, which produces spotting of the fabric softener/antistat on laundry surfaces. A melt viscosity in excess of 75,000 centipoise retards the rate of dispersion such that insufficient fabric softener antistat is transferred to the laundered fabric surfaces within a typical drying cycle of 40 to 60 minutes.

To obtain a melt viscosity of the preferred dispersion-inhibited cationic/nonionic fabric softener/antistat blend with this range, it has been found that the dispersion inhibitor and fabric softener/antistat blend must further be combined with a thickener. In practice, the cationic/nonionic fabric softener/antistat blend is melted, whereupon the requisite quantity of dispersion inhibitor is then added. To this melt, thickener is added until the viscosity reaches the preferred range. It will be apparent to those skilled in the art that the addition of thickeners may also elevate the melting point of the fabric softener/antistat flakes somewhat. There are many acceptable thickeners known to those skilled in the art. These include the fumed or precipitated silicas, bentonite, kaolin clay and organic clays. In addition, zeolites, calcium phosphate, diatomaceous earth and the like may be useful herein. A precipitated fully hydrated silica, such as that sold by the PPG Corporation under the trademark Hi-Sil T-600, is especially preferred.

In order to further provide greater wash cycle integrity of the fabric softener/antistat flakes, and to prevent segregation of the flakes from the granular detergent composition during manufacture, the fabric softener-/antistat flakes are formed in a generally rectangular shape having dimensions of from about 2 millimeters in length, 2 millimeters in width, and a thickness of 1 millimeter to a length of about 6 millimeters, width of 6 millimeters and a thickness of 3 millimeters. Of course, it may acceptable to deviate from these dimensions somewhat to form the flakes in other than rectangular form while still maintaining the requisite stability in the wash cycle and eliminating any segregation problems.

While a greater quantity of fabric softener/antistat composition may be added to each preferred pouch, we prefer a fill weight range of from about 1 to about 8 grams fabric softener/antistat, with a preferred range of about 1.5 to about 3 grams per pouch. Preferably, the fabric softener/antistat flakes contain perfume which is carried over into the dryer for release there.

Detergent

In accordance with the present invention, the detergent composition must provide sufficient detersive action in a quantity of the composition which will loosely fill the chamber of the dispenser pouch. A fill weight range of detergent composition of from about 20 to about 100 grams of detergent composition per pouch is acceptable, with a detergent fill weight of from about 40 grams to about 60 grams per pouch preferred. The detergent composition of this invention must disperse rapidly and completely in the wash water at the beginning of the wash cycle. If the detergent does not fully dispense during the wash cycle, it may leave an undesirable, visible residue on laundered fabrics. It is thus desirable to provide a rapidly soluble, non-caking detergent composition in order to facilitate rapid dispersement of the detergent from the preferred pouch into the wash water. By non-caking, it is meant that the detergent granules do not agglomerate in either the dry or wet state to particle sizes which will impede the flow of detergent through the pores and side valves of the preferred pouch. The detergent composition of the present invention provides free-flowing granules having excellent solubility characteristics. The granule size, as measured by the Tyler mesh scale, should be between 10 mesh and 100 mesh.

Laundry detergent compositions contain a surfactant to provide soil-dispersing and emulsifying properties which form the basis of detergency action. Surfactants suitable for use in detergents are well known to those skilled in the art and include surfactants selected from the group consisting of anionic, cationic, nonionic, ampholytic, zwitterionic, and combinations thereof. Surfactant comprises from about 5 percent to about 25 percent, and preferably from about 12 percent to about 15 percent by weight of the detergent composition herein. In the preferred embodiment, nonionic detergent surfactants of the type including those produced by the condensation of hydrophobic, aliphatic or alkyl aromatic compounds with hydrophilic, alkylene oxide compounds are utilized. Nonionic detergent surfactants useful in the present invention include those obtained through the condensation of aliphatic alcohols having straight or branch carbon chains of from about 10 to about 20 carbon atoms, with 3 to 15 moles of ethylene oxide for each mole of aliphatic alcohol. It will be apparent to those skilled in the art that the carbon chain length between hydrophilic and hydrophobic surfactant components can be controlled to produce the desired water solubility characteristics and that other alkylene oxides, such as butadiene dioxide, can be used to produce suitable nonionic surfactants. The most preferred surfactants for use in the present invention are the condensation products of fatty alcohols having from about 12 to about 15 carbon atoms with 7 moles of ethylene oxide.

In addition to a surfactant, the detergent composition herein contains one or more sequestering agents to inactivate metallic ions which are present in the wash water. Suitable sequestering agents will be known to those skilled in the art and include such phosphate builders as sodium tripolyphosphate, potassium tripolyphosphate, orthophosphate, and pyrophosphate. It will be recognized that non-phosphate builders may also be used effectively. In order to promote rapid solubility of the detergent composition and to provide resistance to caking, it has been found necessary to prehydrate the phosphate builder so that the hydrated phosphate contains from about 15 percent to about 25 percent by weight of water. We prefer to hydrate in a rotary agglomerator in order to obtain granules with high absorbtivity. Medium density granular pentasodium triphosphate hydrated with soft water to a final weight of from about 15 percent to about 25 percent water has been found to be more useful in achieving the requisite solubility characteristics. The hydrated phosphate builder constitutes from about 30 to about 60 percent by weight of the detergent composition of this invention.

The granular detergent composition of the present invention also contains from about 8 percent to about 20 percent by weight of a non-phosphorous, inorganic detergent builder such as sodium carbonate, potassium carbonate, or sodium sesquicarbonate or combinations thereof to provide alkalinity to the wash liquor and to precipitate metallic ions. It has found that from about 8 percent to about 20 percent of sodium carbonate by weight of final detergent composition provides excellent alkaline cleansing power in the present invention. Sodium carbonate content in excess of 20 percent by weight of the final detergent composition produces unacceptable levels of caking.

The preferred detergent composition also contains from about 1 to about 7 percent by weight of the final detergent composition of a soil anti-redeposition agent to help prevent soil from resetting on fabrics after it has been removed during washing. Suitable anti-redeposition agents which are useful in the present invention include sodium carboxymethylcellulose, polyacrylates, polyvinyl pyrrolidone, polyvinyl alcohol and polyethylene glycol. Polyacrylate provides particularly good dispersant action for particulate solids such as clay, dirt and the like. In the preferred embodiment, the detergent of the present invention contains about 1 percent to about 2 percent by weight carboxymethyl cellulose and up to about 5 percent by weight sodium polyacrylate.

In addition to a surfactant, the detergent composition of the present invention may also contain up to 5 percent by weight of the final detergent composition of a washer-effective fabric softener/antistatic agent. Although nonionic and amphoteric surfactants do provide some fabric softening/antistatic action, substantially water insoluble cationic surfactants selected from the class of quarternary ammonium salts are preferred for use herein. In particular, quarternary ammonium chloride salts having one or preferably two fatty acid radicals of from about 8 to about 24 carbon atoms in length are useful herein. Dialkyldimethylammonium chlorides having alkyl groups of from about 12 to 22 carbon atoms, which may be produced from long chain fatty acids, are especially washer-effective fabric softeners-/antistats. Specific quarternary ammonium compounds which are useful in the present invention are dihexadecyldimethylammonium chloride, dioctadecyldimethylammonium chloride and dihexadecyldiethylammonium chloride or the corresponding sulfate salts. We have found distearyldimethylammonium chloride to provide excellent results.

In addition, the detergent composition herein contains up to about 36 percent by weight of a suitable filler to provide the appropriate detergent composition density. The bulk density of the preferred detergent herein may be as low as 0.3 grams per cubic centimeter with a preferred range of from about 0.65 g/cc to about 0.75 g/cc. It has been found that a density below 3 g/cc requires a rather large pouch to contain an effective amount of detergent. Suitable fillers for use in the present invention will be apparent to those skilled in the art. In the preferred embodiment, sodium sulfate is used.

The detergent herein may also contain up to 1 percent of an enzyme mixture to help break down certain soils and stains to simpler forms. These soils and stains can then be more easily removed during the laundering process. A mixture of a proteolytic enzyme and an amylolytic enzyme is preferred.

It will be obvious to those skilled in the art that other fabric-enhancing agents which are compatible with the preferred detergent components could be incorporated into the detergent composition in accordance with the broader aspects of the present invention and may include certain optical brighteners, germicides, perfumes, waterproofing agents, sizing agents, other soil release agents, bleaches, fabric fresheners, and the like. Thus, it is understood that the above is merely a preferred embodiment of the invention and that various changes and alterations can be made without departing from the spirit and broader aspects thereof as set forth in the appended claims which are to be interpreted in accordance with the principles of patent law, including the doctrine of equivalents.

In Use

In use, the preferred dispenser pouch, containing from about 1 gram to about 3 grams of the preferred softener/antistat and from about 40 grams to about 60 grams of the preferred detergent, is placed in the bottom of a washing machine tank. Laundry is then placed in the tank on top of the pouch. The desired wash and rinse cycles are programmed and the wash cycle is started. As water reaches the pouch, it enters the pouch chamber through the side valves as well as through the pouch fabric. The pouch fabric is then wetted out and a detergent slurry is formed. When mechanical agitation of the washer begins, the pouch is repeatedly compressed and released by the laundry load as both pouch and laundry move about the tank interior in response to the agitator action. This cycle of compression and release causes the pouch side valves to repeatedly open and close. When the pouch is compressed, multiple valves open and the detergent slurry is forced through the valve openings into the wash liquor and solubilized detergent is forced through the pores. Shortly after the beginning of the wash cycle, the majority of the detergent is in solution in the wash liquor. The fabric softener/antistat chips, being somewhat larger than the valve openings, are retained in the pouch chamber during the wash and rise cycle. By the end of the first three minutes of the wash cycle, essentially all of the detergent has left the pouch chamber.

Following the rinse and spin dry cycles, the damp laundry and the pouch are transferred to the automatic dryer. During the drying cycle, the pouch quickly dries before most other laundered fabrics. As the pouch and fabric softener/antistat chips heat to the internal temperature of the dryer, the chips melt and wick through the pores of the pouch fabric, coating the pouch exterior. The coated pouch tumbles with the laundry load and the fabric softener/antistat composition is transferred from the exterior pouch surfaces to the laundry surfaces by physical contact. The treated laundry is thereby sequentially cleaned and softened and rendered essentially static-free.

EXAMPLE

The preferred dispenser was formed by folding a sheet of non-woven, spun-bonded polypropylene fabric having an average weight of 1.5 oz./yd$^2$ and an air permeability of 200 cfm/ft$^2$ into the shape of a tube which was ultrasonically heat sealed along the longitudinal fabric overlap. One end of the fabric tube was then ultrasonically heat sealed to form an intermittent seal line recessed approximately three-eighths of an inch from the edge of the pouch fabric. The intermittent slots were about 3-6 millimeters long.

The preferred detergent composition was prepared by first prehydrating the sodium tripolyphosphate in a rotary agglomerator and then mixing the dry ingredients according to the following formula:

| Ingredient | % by weight |
|---|---|
| Fully Hydrated Sodium Tripolyphosphate | 43.5 |
| Nonionic Detergent Surfactant | 14.25 |
| Perfume | .15 |
| Sodium Carbonate | 16.00 |
| Sodium Sulfate | 5.80 |
| Carboxymethyl Cellulose | 1.60 |
| Fluorescent Whitening Agent | .35 |
| Distearyldimethylammonium Chloride | 2.25 |

-continued

| Ingredient | % by weight |
|---|---|
| Sodium Polyacrylate | 1.50 |
| Sodium Metasilicate Pentahydrate | 14.00 |
| Protease and Amylase Blend | .60 |

Fifty grams of the remaining detergent was then mixed with 1.8 grams of the preferred fabric softener/antistat which was prepared in accordance with the following formula:

| Ingredient | % by weight |
|---|---|
| Dihydrogenated Tallow Dimethyl Ammonium Methyl Sulfate | 35.70 |
| Ethoxylated Stearc Acid | 15.30 |
| Stearyl Alcohol | 30.00 |
| Fully Hydrated Precipitated Silica | 15.00 |
| Perfume | 4.00 |

The fabric softener/antistat was prepared in a molten state with a viscosity of about 30,000 to 40,000 centipoise and extruded in ribbons which were cut to a length of 5 millimeters. The fabric softener/antistat chips were 5 millimeters wide and 1½ millimeters thick. The detergent and fabric softener/antistat mixture was then placed inside the preferred pouch. The fill weight of the composition was 51.8 grams. The open pouch end was then ultrasonically heat sealed shut in a manner identical to the first end. The pouch was placed inside a machine washer and soiled test fabrics were added to make an average laundry load. The washer was then run through wash, rinse, and spin dry cycles. After the spin dry cycle, the laundry load and pouch were transferred to a machine dryer where the laundry load was fully dried. The laundry was removed and observed to be clean, soft and substantially static-free.

What is claimed is:

1. The method of packaging a mixed quantity of first and second distinct materials for subsequent release from the package in a phased sequence whereby substantially all of the first material but less than a majority of the second material will be automatically released from the package when the package and its contents are subjected to a first set of ambient conditions, and the majority of the second material will be automatically released from the package only when the package and its contents are subjected to a second set of ambient conditions, the first material being fully water soluble and the second material being no more than partially water soluble under the first set of ambient conditions, and the second material having a melting point which is above the temperatures normally encountered during the first set of ambient conditions but which is less than the temperatures encountered during the second set of ambient conditions, the method comprising the steps of:

(1) forming a pouch-like dispensing package from a porous fabric, with the porosity being selected to permit passage of water and of said second material when in its melted condition but to normally prevent passage of either of said first and second materials therethrough when said package is kept out of water and below the melting point of said second material;

(2) forming a plurality of supplementary openings in said package, which openings are normally in a substantially closed condition wherein the minimum dimension of each of said openings is small enough relative to the form and dimensions of said first and second materials that no more than an insignificant amount of said first material and none of said second material will pass therethrough during normal handling of said package, said openings tending to remain in their substantially closed condition as a result of the natural lay of the fabric, the shape of said package, and the placement of said openings therein, but said openings tending to enlarge their minimum dimension when said package is exposed to the first set of ambient conditions, including simultaneous submergence in water, agitation and impact, the enlarged condition of said openings permitting an increased rate of water flow into and out of said package to effect complete dispensing of undissolved and dissolved portions of said first material from the package while still being small enough relative to the form and dimensions of said second material to prevent dispensing of said second material from said package; and (3) placing a desired mixture of said first and second materials into said package and closing said package except for said pores and supplementary openings.

2. The packaging method of claim 1 wherein said first and second materials are laundry additives and said first and second set of ambient conditions are the washing and drying phases of a machine clothes washing and drying operation, respectively.

3. The packaging method of claim 2 wherein said first additive is a clothes washing detergent.

4. The packaging method of claim 2 wherein said second additive is a fabric softener/antistat.

5. The packaging method of claim 2 wherein said first additive is a clothes washing detergent and said second additive is a fabric softener/antistat.

6. The packaging method of claim 1 wherein said package is formed by the steps of:

(1) joining two overlapping edges of said fabric together along a first longitudinal joint to form a tube-shaped pouch pre-form having first and second open ends;

(2) joining opposed walls of said tube-shaped preform along a transverse line adjacent a first open end of said pre-form;

(3) filling the interior of said pre-form with a predetermined mixture of said first and second materials; and (4) joining said opposed walls of said pre-form along a second transverse line adjacent the other open end of said pre-form to form a generally flat rectangular pouch which contains said first and second materials;

(5) at least one of said transverse lines of joinder being interrupted by portions of said opposed walls which are not joined, to thereby define said plurality of supplementary openings.

7. The packaging method of claim 6 wherein said joining steps are performed by a heat sealing process.

8. A method of packaging and dispensing a predetermined quantity of clothes washing detergent and a fabric softener during a machine clothes washing and drying cycle, comprising the steps of:

(1) packaging a mixture of water soluble detergent in granular form and a substantially less soluble fabric softener/antistat in large chip form in a chamber defined by porous fabric formed into a pouch-like container;

(2) forming said fabric softener/antistat chips of a material the majority of which will remain unmelted and undissolved during the conditions normally encountered in the washing and rinsing cycle, but which will melt during the higher temperature conditions of the drying cycle and pass through said fabric pores to coat the outside of said container for subsequent transfer to the clothing during the drying cycle;

(3) selecting the fabric porosity and the particle size of said detergent such that water can flow through said fabric but said detergent particles, when in undissolved form, cannot pass through said fabric;

(4) forming said container by the steps of:

(a) joining two overlapping edges of said fabric together along a first longitudinal joint to form a tube-shaped pouch pre-form having first and second open ends;

(b) joining opposed walls of said tube-shaped preform along a transverse line adjacent a first open end of said pre-form;

(c) filling the interior of said pre-form with a predetermined mixture of said detergent and fabric softener/antistat; and (d) joining said opposed walls of said pre-form along a second transverse line adjacent the other open end of said pre-form to form a generally flat rectangular pouch which contains said detergent and fabric softener/antistat;

(e) at least one of said transverse lines of joinder being interrupted by portions of said opposed walls which are not joined, to thereby define a plurality of supplementary openings;

(5) forming said supplementary openings so that they are normally maintained in a substantially closed condition by the configuration and construction of said container, in which condition no more than an insignificant amount of said detergent particles will pass therethrough during normal handling of said container prior to use, but said supplementary openings tending to enlarge once said container is subjected to flexing and impact induced by agitation, impact and water submergence during a clothes washing cycle, whereby an increased rate of water flow into and out of said container will effect complete dispensing of undissolved and dissolved portions of said detergent from said container during the clothes washing cycle when said container is initially placed in a clothes washing machine along with a load of clothes to be washed; and (6) selecting the size and shape of said supplementary openings relative to the size and shape of said fabric softener/antistat chips such that said chips will not pass through said supplementary openings under any normally encountered conditions below the melting point of said chips;

(7) whereby said container can be placed in a clothes washing machine with the clothes to be washed, and substantially all of said detergent but less than a majority of said fabric softener/antistat will be automatically dispensed from said container during the washing cycle, thereafter said container being transferred with the washed clothes to the clothes drying machine, wherein said fabric softener/antistat will be dispensed from said container.

9. The packaging method of claim 8 wherein said joining steps are performed by a heat sealing process.

10. The packaging method of claim 8 wherein each of said fabric softener/antistat chips has a volume between about 0.004 cubic centimeters and about 0.11 cubic centimeters.

11. A package from which a mixed quantity of first and second laundry additives can be released in a phased sequence in response to the differing conditions of the washer phase and dryer phase of a clothes washing and drying operation, comprising:

a pouch-like container formed of porous fabric material and containing a first granular laundry additive which is substantially fully water soluble under the washer phase conditions and a second laundry additive present in the form of larger chips, said second additive having a melting point which is above the temperatures normally encountered in the washer phase, the majority of said second laundry additive being water insoluble during the washer phase;

said porous fabric having a porosity selected to permit passage of water and of said second laundry additive when said second laundry additive is in its melted condition, but to normally prevent passage of either of said first and second laundry additives therethrough when said package is kept out of water and below the melting point of said second laundry additive;

said container being provided with a plurality of supplementary openings, which are normally maintained in a substantially closed condition as a result of the natural lay of said fabric, the shape of said container and the placement of said openings therein, but said openings and said container being so constructed that said openings tend to enlarge when said container is subjected to the conditions of the washer phase, including simultaneous submergence in water, agitation and impact of said container; said enlarged condition of said openings permitting an increased rate of water flow into and out of said container to effect complete dispensing of said first laundry additive during said washer phase; in said substantially closed condition of said openings the minimum dimension across each of said openings being small enough relative to the form and size of said first laundry additive particles to normally permit no more than an insignificant amount of the dry first laundry additive to pass therethrough during normal handling of said container and to permit substantially none of said second laundry additive chips to pass therethrough during normal handling of said container and during said washer phase; and in said enlarged condition of said openings the minimum dimension across each of said openings remaining small enough relative to the size and shape of said second laundry additive chips to prevent passage of any unmelted chips therethrough;

whereby when said container and its contents are subjected to said washer phase, including submergence in water, agitation and impact, substantially all of said first laundry additive will be dispensed therefrom in dissolved form through the porous fabric and in dissolved and undissolved form through said supplementary openings, with the majority of said second laundry additive remaining undispensed within said container throughout said washer phase, and when said container and its remaining contents are subjected to said dryer phase, including a temperature above the melting point of said second laundry additive, said chips will melt and said second laundry additive will wick through said fabric pores and coat the outside of said container.

12. The package of claim 11 wherein said first laundry additive is a clothes washing detergent.

13. The package of claim 12 wherein said detergent comprises:

(a) from about 5% to about 25% by weight of an organic significant;

(b) from about 30% to about 60% by weight of a fully hydrated phosphate detergent builder;

(c) up to about 20% by weight of a non-phosphate detergent builder;

(d) from about 1% to about 7% by weight of a soil antideposition agent.

14. The package of claim 11 wherein said second laundry additive is a fabric softener/antistat.

15. The package of claim 14 wherein each of said fabric softener/antistat chips has a volume between about 0.004 cubic centimeters and about 0.11 cubic centimeters.

16. The package of claim 14 wherein said fabric softener/antistat comprises:

(a) from about [45% to about 55% ] *30% to about 40%* by weight of a quaternary ammonium compound having at least one alkyl group of about 12 to about 24 carbon atoms;

(b) from about 10% to about 20% by weight of a nonionic antistatic agent;

(c) from about 25% to about 35% by weight of a fatty alcohol having from about 14 to about 26 carbon atoms;

(d) a quantity of viscosity modifier sufficient to raise the fabric softener/antistat composition melt viscosity to within the range of about 15,000 centipoise to about 75,000 centipoise.

17. The package of claim 14 wherein said fabric softener/antistat has a melt viscosity of between about 15,000 centipoise to about 75,000 centipoise, and said pouch fabric has a porosity of between about 150 cubic feet per minute per square foot to about 300 cubic feet per minute per square foot.

18. The package of claim 11 wherein said first laundry additive is a clothes washing detergent and said second laundry additive is a fabric softener/antistat.

19. The package of claim 11 wherein said supplementary openings are located in an interrupted line of joinder between opposed walls of said container, said line of joinder partially closing one end of the package, the interruptions between the joined portions along said line defining said supplementary openings.

20. The package of claim 19 wherein said interrupted line of joinder is formed by a heat sealing process.

21. The package of claim 19 wherein said line of joinder is spaced slightly from said end of the package so that the portion of said fabric walls between said line of joinder and said end of the package aids in normally maintaining said supplementary openings in a substantially closed condition.

22. A package from which a mixed quantity of first and second laundry additives can be released in a phased sequence in response to the differing conditions of the washer phase and dryer phase of a clothes washing and drying operation, comprising:

a pouch-like container formed of a porous fabric material and containing a first laundry additive which is effective during the washer phase and which is substantially fully water soluble under the water phase conditions, and a second laundry additive which comprises a fabric softener/antistat which is present in the form of particles each having a volume of between about 0.004 cubic centimeters and about 0.11 cubic centimeters and which has a melting point which is above the temperatures encountered in the washer phase, the majority of said fabric softener/antistat being water insoluble during the washer phase;

said porous fabric having a [porous] *porosity* of between about 150 cubic feet per minute per square foot and about 300 cubic feet per minute per square foot, and said fabric softener/antistat having a melt viscosity of between about 15,000 centipoise and about 75,000 centipoise, said fabric porosity permitting passage of water and of said fabric softener-/antistast when it is in its melted condition, but normally preventing passage of either of said first laundry additive and said fabric softener/antistat therethrough when said package is kept out of water and below the melting point of said fabric softener/antistat;

said fabric softener/antistat comprising from about [45] *30* percent to about [55] *40* percent by weight of a quaternary ammonium compound having at least one alkyl group of about 12 to about 24 carbon atoms, from about 10 percent to about 20 percent by weight of a nonionic antistatic agent and from about 25 percent to about 35 percent by weight of a fatty alcohol having from about 14 to about 26 carbon atoms.

*23. A package from which a mixed quantity of first and second laundry additives can be released in a phased sequence in response to the differing conditions of the washer phase and dryer phase of a clothes washing and drying operation, comprising:*

*a pouch-like* container formed of a porous fabric material and containing a first laundry additive which is effective during the washer phase and which is substantially fully water soluble under the water phase conditions, and a second laundry additive which comprises a fabric softener/antistat which is present in the form of particles each having a volume of between about 0.004 cubic centimeters and about 0.11 cubic centimeters and which has a melting point which is above the temperatures encountered in the washer phase, the majority of said fabric softener/antistat being water insoluble during the washer phase;

*said porous fabric having a porosity of between about 150 cubic feet per minute per square foot and about 300 cubic feet per minute per square foot, and said fabric softener/antistat having a melt viscosity of between about 15,000 centipoise and about 75,000 centipoise, said fabric porosity permitting passage of water and of said fabric softener/antistat when it is in its melted condition, but normally preventing passage of either of said first laundry additive and said fabric softener-/antistat therethrough when said package is kept out of water and below the melting point of said fabric softener/antistat;*

*said fabric softener/antistat comprising from about 30 percent to about 40 percent by weight of a quaternary ammonium compound having at least one alkyl group of about 12 to about 24 carbon atoms, from about 10 percent to about 20 percent by weight of a nonionic antistatic agent and from about 25 percent to about 35 percent by weight of a dispersion inhibitor which improves the wash endurance of the flake and decreases the fabric softener/antistat solubility so that the flakes do not substantially dissolve in the wash cycle.*

*24. The package of claim 23 in which said fabric softener/antistat additionally includes a sufficient thickener to give said fabric softener/antistat a melt viscosity of from about 15,000 centipoise to about 75,000 centipoise.*

*25. The package of claim 24 in which said thickener is selected from the group comprising fumed or precipitated silicas, bentonite, kaolin clay, organic clays, zeolites, calcium phosphate and diatomaceous earth.*

*26. The package of claim 25 in which said dispersion inhibitor comprises a fatty alcohol having from about 14 to about 26 carbon atoms.*

* * * * *